Patented Jan. 20, 1942

2,270,409

UNITED STATES PATENT OFFICE 2,270,409

CARBOXYLIC ACIDS OF THE CYCLOPENTANO POLYHYDRO PHENANTHRENE SERIES AND A PROCESS OF MAKING THE SAME

Adolf Butenandt, Berlin-Dahlem, Hans Dannenbaum, Falkenhain-Finkenkrug, near Berlin, and Josef Schmidt-Thomé, Berlin-Dahlem, Germany, assignors to Schering Corporation, Bloomfield, N. J., a corporation of New Jersey No Drawing. Application April 18, 1939, Serial No. 268,518. In Germany April 21, 1938

28 Claims. (Cl. 260—397.1)

This invention relates to carboxylic acids of the cyclopentano polyhydro phenanthrene series and a process of making the same.

In United State Patent No. 2,150,885, issued to Schoeller and Serini on March 14, 1939, there is described a process for the manufacture of cyanhydrins of compounds of the aetiocholane series according to which saturated or unsaturated aetiocholanones or aetioallocholanones are brought into reaction with hydrocyanic acid or agents giving off hydrocyanic acid. By this means for example from dehydroandrosterone or its derivatives in which the hydroxyl group is converted into a group reconvertible into this group, a compound of the formula

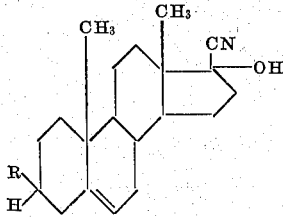

is obtained in which R=hydroxyl or a substituent convertible into the hydroxyl group, which therefore contains in 17-position together with the cyano group a further hydroxyl group.

The compounds obtained in this manner, containing the cyanhydrin grouping in 17-position, easily split off hydrocyanic acid again on further conversion of the said grouping; thus, it is not easily possible by hydrolysis of the nitrile group to arrive at the corresponding carboxylic acid.

In accordance with the present invention the splitting off of the hydrocyanic acid is prevented if the cyanhydrins prior to the hydrolysis to the carboxylic acids are dehydrated. The dehydration may take place as described in copending specification Serial No. 268,519, filed April 18, 1939, by the action of agents splitting off water, in particular by heating with phosphorus oxyhalide in pyridine.

The temperature at which water is split off has a great influence upon the manner of carrying out this process and especially upon the yield obtained, while the amount of the amine present and of the phosphorus oxyhalide does not seem to be of great importance and may vary to a certain degree. The nature of the amine used, however, plays also an important part in order to produce optimal yields. For, it has been found that the yield of unsaturated nitrile increases when heating the starting material with pyridine and phosphorus oxyhalide not at the boiling temperature of the pyridine (at about 110–120° C.) but at a higher temperature, for instance, at about 150° C., i. e. by heating in an autoclave or closed glass tube. If it is desired to avoid the use of an autoclave or a sealed glass tube, instead of pyridine a higher boiling amine may be used and the reaction mixture may be boiled therewith under reflux. Especially suitable have proved, for instance, alkylated tertiary aniline bases or suitable mixtures of pyridine and quinoline the boiling temperature of which may be varied in any desired manner in accordance with the proportion of the components of the mixture.

Especially suitable amines have proved to be the pyridine homologues containing several alkyl groups such as lutidine and collidine since by their use not only the yield of the final product is increased but also its quality. A further advantage is achieved by using these amines since they can be very readily recovered from the reaction mixture by steam distillation and can be used again. Furthermore the above mentioned amines allow carrying out the splitting off of water at temperatures (170–190° C.) at which the treatment of the starting materials with pyridine and phosphorus oxyhalide gives only a very bad yield and a mixture of oily products the purification of which is very difficult.

The $\Delta_{16.17}$-unsaturated nitriles can be hydrolysed, for example, by heating with alkalies or acids to the corresponding carboxylic acids (compare Houben-Weyl, Die Methoden der organ. Chemie, 1923, vol. 3, page 655 et seq).

If it is desired to produce the carboxylic acids saturated in the cyclopentane ring then either the $\Delta_{16.17}$-unsaturated carboxylic acids obtained after the hydrolysis of the $\Delta_{16.17}$-unsaturated nitriles can be hydrogenated or if they contain in the nucleus further double bonds, partially hydrogenated. It is possible, however, also to proceed in such a manner that the $\Delta_{16.17}$-unsaturated nitriles are first hydrogenated to the nitriles saturated in the cyclopentane ring and these then hydrolysed to the acids saturated in ring D.

This last mentioned modification of the process offers certain advantages since the hydrogenation of the unsaturated nitrile takes place more rapidly than that of the unsaturated acid and furthermore secondary reactions, which take place in the alkaline hydrolysis of the unsaturated nitrile to the acid on account of the presence of an $\alpha,\beta$-double bond together with the cyano group, are avoided. The process can, therefore, be carried out in this manner with better yields.

For the hydrogenation there are suitable the known processes for the addition of hydrogen to a double bond; as they are described, for instance, in Houben-Weyl, Methoden der organ. Chemie, 1925, vol. 2, pages 305–311; it is particularly recommended to employ catalytically activated hydrogen in which case as catalysts both noble and also base metals can be employed. As catalysts are suitable, for example, nickel catalysts with and without carrier, as, for example, Raney nickel, palladium or platinum black and the like.

If compounds are employed as starting materials which are unsaturated in the ring system in other positions in addition to the 16.17-position and such double bonds are intended to remain it is to be recommended to interrupt the hydrogenation after the taking up of 1 mol of hydrogen or to protect these double bonds which are intended to remain, for example, by adding on such groups as can be split off again with the reformation of the double bond (Houben-Weyl, Methoden der organ. Chemie, vol. 2, pages 355–367).

The hydrolysis of the nitrile group takes place suitably by heating with alkaline agents, for example, by heating with aqueous-alcoholic alkali solution, in which case if desired the process may be conducted under elevated pressure.

Particularly valuable compounds are obtained if as starting material the cyanhydrin of dehydroandrosterone or of a 3-acyl compound thereof is employed. In this manner the corresponding 3-hydroxy aetiocholenic acids are obtained.

In accordance with a further feature of the invention in the hydrolysis of such anhydronitriles and in particular in the hydrolysis in an alkaline medium, together with the desired unsaturated carboxylic acids a further number of partly acid, partly neutral compounds can be isolated in the form of suitable derivatives which can be separated, for example, by means of acetylation, chromatographic separation and fractional crystallisation into a number of chemically uniform crystallisates. There are concerned in this case compounds saturated in the cyclopentane ring, namely already saturated carboxylic acids and their esters, which owe their production either to a hydration in various directions of the 16.17-double bond of the unsaturated nitrile under the influence of the adjacent cyano group or to a hydrogenation of the same system (by metal dust of the autoclave material or by the possible addition of metallic catalysts of hydrogenating action as, for example, nickel, iron alloys and the like and the alcohol under the activating influence of the alkalies) and on account of their difficult hydrolysis as tertiary group in 17-position can only slowly be degraded. In the mother liquors of the reaction mixture further saturated compounds are present in the case of which are concerned the corresponding epimeric compounds or also still further hydrogenated or hydroxylated compounds if nuclear unsaturated cyanhydrin are employed as starting materials.

The process may be illustrated by the following scheme of formulae in the case of which as starting material a dehydro-androsterone-cyanhydrin is employed wherein R is oxygen, a hydroxyl group or a group, which can be converted, for example, by hydrolysis into a hydroxyl group:

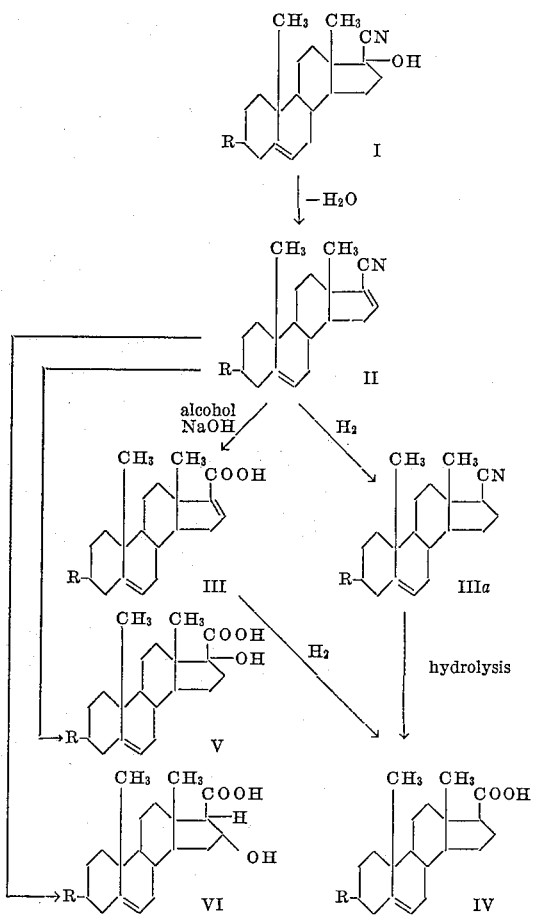

The following examples illustrate the invention:

EXAMPLE 1

2 grams of dehydro-androsterone-cyanhydrin acetate mixture are boiled in a mixture of 20 ccs. of pyridine and 5 ccs. of phosphorus oxychloride for 10 minutes. Thereupon the whole is cooled and carefully poured drop by drop into ice water which contains the necessary quantity of hydrochloric acid (about 20 ccs. of concentrated hydrochloric acid) for neutralisation of the pyridine. The decomposition of the excess reagent takes place very violently. The deposited precipitate is filtered off, washed with water and dried by suction. It is dissolved in pyridine, the solution boiled and thereupon sprayed with hot water to the commencement of crystallisation. There crystallise beautiful long needles which are to some extent still contaminated by a difficultly soluble secondary product. The product is dissolved in acetone, the difficultly soluble secondary product filtered off, and the solution sprayed with water to the point of crystallisation. Yield: 1.1 grams. The product exhibits after recrystallisation from dilute acetone or from ethyl acetate a melting point of 210° C. Since the water splitting product of the cyanhydrin acetate-(3) tenaciously retains solvent in the crystal, it is sublimed at 210° C. in a water pump vacuum. Only by this means are correct analysis values obtained. The U. V. absorption commences at 240 mu and increases towards shorter wave lengths.

EXAMPLE 2

400 mgs. of dehydroandrosterone acetate hydroxy nitrile (3-acetoxy-17-cyano-17-oxy-$\Delta_5$-androstene which hereinafter is called "hydroxy nitrile") in the form of a mixture of the two 17-isomers that are obtained when making said hydroxy nitrile, are dissolved in a mixture of 10 ccs. of pyridine and 0.15 cc. of phosphorus oxychloride and heated in a sealed glass for 1½ hours at 150° C. The dark, but still clear solution is poured into a mixture of ice and 40 ccs. of concentrated hydrochloric acid and the precipitate formed is filtered off. It is dissolved in acetone, freed from undissolved particles by filtration and sprayed with hot water whereby 300 mgs. of 17-cyano-3-acetoxy-$\Delta_{5,6}$-$\Delta_{16,17}$-androstadiene of melting point 206° C. (in the following briefly designated as "dehydro nitrile") are obtained. The yield amounts to 79%.

EXAMPLE 3

2.4 grams of "hydroxy nitrile" are dissolved in a mixture of 40 ccs. of quinoline and 20 ccs. of pyridine, mixed with 0.9 cc. of phosphorous oxychloride, and heated to boiling. A thermometer suspended in the boiling solution indicates a temperature of about 160° C. After boiling for 1½ hours the reaction mixture is cooled, poured into a mixture of 250 ccs. of concentrated hydrochloric acid and 500 grams of ice and exhaustively extracted with ether. The ethereal extract is washed with sodium bicarbonate solution and water, dried over sodium sulphate and evaporated to dryness whereby 1.72 grams of a slightly yellowish but beautifully crystalline substance which after recrystallisation has a melting point of 205–209° C. are obtained.

EXAMPLE 4

1 gram of "hydroxy nitrile" is dissolved in 15 ccs. of dimethyl aniline mixed with 0.4 cc. of phosphorus oxychloride and heated for 1½ hours while excluding moisture in a glycerol bath the temperature of which is kept constant at 150° C. The light brown clear solution is then poured upon a mixture of 100 grams of ice and 60 ccs. of concentrated hydrochloric acid exhaustively extracted with ether, the ether extract purified as described in the preceding example and evaporated to dryness. There remain 1.27 grams of a brownish oil containing crystals from which by chromatographic separation and crystallisation of the hexane extract obtained thereby 60 mgs. of a beautifully crystallising "dehydro nitrile" of melting point 197° C. are obtained. This product can be further purified by recrystallisation from propanol-water until it shows a melting point of 207–210° C.

EXAMPLE 5

1 gram of "hydroxy nitrile" is reacted with quinoline and phosphorus oxychloride under the same conditions as described in Example 4 and worked up in the same manner. Thereby 665 mgs. of a beautifully crystallising yellowish crude product are obtained from which by chromatographic separation and crystallisation about 450 mgs. of "dehydro nitrile" of melting point of 200° C. are obtained.

EXAMPLE 6

5.2 grams of "hydroxy nitrile" are dissolved in 90 ccs. of collidine and mixed with 4.5 ccs. of phosphorus oxychloride in the cold. Without regard for a crystalline precipitation—most probably consisting of an addition compound of the halogenide with the bath—the reaction mixture is first heated for ½ hour on a steam bath to 80–90° C. and then for 1½ hours over a fire to boiling. Thereafter it is allowed to cool and after removing the excess of the collidine used (for instance, according to the following Example 8) the blackish reaction mixture is extracted with ether. The ether extract yields after purification and drying 3.89 grams of an almost colorless well crystallising substance of melting point 187–195° C. Thereafter the dehydroandrosterone acetate present therein which on the one hand may be present in the hydroxy nitrile used as starting material on account of its ready decomposition, but which may also be formed during the splitting off of water, is removed by precipitation by means of semicarbazide, whereafter 2.77 grams of a beautifully crystallising product of melting point 207–209° C. are obtained. When taking into consideration the recovered dehydroandrosterone acetate (1.033 gram) the yield amounts to about 74% of the theoretical yield.

EXAMPLE 7

5.2 grams of "hydroxy nitrile" are reacted in the same manner as described in Example 6 with 4.5 ccs. of phosphorus oxychloride in 90 ccs. of lutidine. The reaction mixture is worked up as described above whereby 4.78 grams of a beautifully crystallising slightly yellowish crude product are obtained. Therefrom 917 mgs. of dehydroandrosterone acetate (melting point 166° C.) are removed by precipitation with Girard-T-reagent and 3.82 grams of almost pure "dehydro nitrile" of melting point 199° C. are obtained. This crude product is finally purified by recrystallisation from propanol water. The yield amounts to about 95% of the theoretical yield when taking into consideration the recovered ketone.

EXAMPLE 8

Recovery of the amine used as solvent

The cooled reaction mixture of Example 7 which has been heated for 1½ hours under reflux is cooled with water and mixed while stirring with 6 grams of sodium hydroxide dissolved in 15 ccs. of water (3 mol sodium hydroxide calculated for 1 mol phosphorus oxychloride used). The container is then connected with a descending cooler and steam is passed through the container placed in a bath heated to about 100° C. until all the volatile amine has been distilled off. The residue is worked up in accordance with Examples 6 and 7 to "dehydro nitrile." The distillate is set with sodium chloride and the amine separated is extracted with ether, the ethereal solution is dried with sodium sulphate or barium hydroxide and distilled from a flask provided with a fractionating column. Thus, 73 ccs. (about 80%) of lutidine are recovered from 90 ccs. of lutidine used in the reaction. This lutidine can again be used for synthetical purposes since it has the proper boiling point of 150–157° C. at 760 mm.

The recovery of the amine used according to the preceding example has, besides its economical effect, at the same time a technical advantage since thereby the amine is freed from all impurities that are not stable against highly heated phosphorus oxychloride as they very often are present in not absolutely pure pyridine homologues and can affect the splitting off of water disadvantageously.

Example 9

1 gram of 17-cyano-$\Delta_5.\Delta_{16}$-3-acetoxy-androstadiene is dissolved in 35 ccs. of alcohol and a solution of 5 grams of caustic soda in 15 ccs. of water introduced. The mixture is heated in a bomb tube for 3 hours to 180° C. In order to protect the glass from the attack of the alkali the solution is introduced into a copper tube and this melted in the bomb tube. When the reaction is complete the whole is poured into water, acidified with sulphuric acid and the deposited precipitate filtered off and washed with water. After recrystallisation from acetone and from ethyl acetate there is thus obtained the $\Delta_5.\Delta_{16}$-3-hydroxy-androstadiene-17-carboxylic acid in small needles of M. P. 256° C. with decomposition.

The ultra-violet absorption commences at 254 mu and increases strongly towards shorter wave lengths. The yield amounts to 50%.

Example 10

A solution of 100 mg. of the doubly unsaturated $\Delta_5.\Delta_{16}$-3-hydroxy - androstadiene - 17 - carboxylic acid in 50 ccs. of ether is added to a mixture of 200 ccs. of water and 6 ccs. of N-caustic soda solution and strongly shaken. The ether is distilled out of the mixture and the last residues of ether removed in vacuum. The clear aqueous solution is thereupon shaken with nickel catalyst according to Raney in a hydrogen atmosphere up to saturation with hydrogen, the catalyst filtered off and the solution concentrated in vacuum to about 30 ccs. Thereupon the whole is acidified with strong hydrochloric acid and the deposited precipitate filtered off. After recrystallisation from acetone 95 mg. are obtained of an acid which crystallises in leaflets and melts at 276° C. with decomposition. By a mixed melting point test it is identified as $\Delta_5$-3-hydroxy-aetiocholenic acid.

40 mg. of the hydrogenated acid are dissolved in 2 ccs. of pyridine and after the addition of 2 ccs. of acetic anhydride allowed to stand over night at room temperature. The mixture is then treated with water and the pyridine neutralised with hydrochloric acid. The pricipitate deposited after acidification is filtered off and recrystallised from acetone. Leaflets are obtained of M. P. 240–241° C. in a yield of 30 mg. The product obtained exhibits no depression in a mixed melting point test with $\Delta_5$-3-acetoxy-aetiocholenic acid of M. P. 242° C.

Instead of caustic soda solution under otherwise the same conditions also caustic potash solution can be employed. This is more advantageous than the application of caustic soda solution since the potassium salt of the doubly unsaturated acid is more easily soluble in water.

Example 11

0.5 gram of the anhydro-nitrile II (=3-acetoxy-17-cyano-$\Delta_5.\Delta_{16}$-aetio-cho¹adiene) obtained by splitting out water from the cyanhydrin of dehydroandrosterone acetate I is shaken in 100 ccs. of absolute alcohol with Raney nickel (180 mg. of nickel) at room temperature until 1 mol of hydrogen=36 ccs. has been taken up. Then the whole mixture is filtered through an extraction thimble, the remaining catalyst extracted under carbon dioxide in a Soxhlet extractor with acetone and the combined filtrates evaporated in vacuum. The yield of the compound obtained amounts to 0.5 gram; the melting point is not sharp, between 202° and 220° C. since two epimeric hydrogenation products have been produced which even by fractional crystallisation are difficultly separated; their analysis figures are however the same and they behave spectroscopically as a 16.17-saturated nitrile.

By addition of some alcoholic alkali the rapidity of the hydrogenation is considerably accelerated but the preparations obtained melt at a lower temperature since the lower melting epimer is then formed to a preponderating extent.

Example 12

1 gram of the hydrogenation product which contains together the two epimeric forms of IIIa, is heated in an autoclave with 5 grams of caustic soda, 7.5 ccs. of water and 40 ccs. of 96% alcohol for 3 hours to 165–170° C. and the reaction mixture then allowed to cool for several hours. The autoclave is washed out with a little hot water and hot alcohol, the whole diluted further with 500 ccs. of water, extracted twice with 300 ccs. of ether each time in order to remove residues of unhydrolysed neutral portions and acidified with concentrated hydrochloric acid. The crude acid which is deposited in flocks is isolated by thorough extraction with 750 ccs. of ether divided into three equal portions and the crude product which remains after evaporation of the ether which has been well washed with water and dried over sulphate, recrystallised from acetone with addition of water. The acid produced in 50% yield melts at 230–260° C.; it constitutes a mixture of the two possible forms epimeric on the 17-carbon atom and can by fractional crystallisation be resolved into the components of M. P. 262° C. and 276° C.

Example 13

17 - cyano - $\Delta_5.\Delta_{16}$ - 3 - acetoxy - androstadiene is hydrolysed with aqueous alcoholic alkali in an autoclave at 180° C. and from the acids formed the $\Delta_5.\Delta_{16}$-3-hydroxy-androstadiene - 17 - carboxylic acid after acidification with sulphuric acid separated by treatment with acetone as a difficultly soluble crystallisate.

The acid constituents easily soluble in the acetone solution are separated in the manner known per se for example by evaporation of the solvent in vacuum and then acetylated with pyridine and acetic anhydride. The crude acetate mixture thereupon isolated in the customary manner is dried in vacuum and methylated with an excess of ethereal diazo-methane solution. The acetate-methyl-ester obtained by distilling off the excess of diazo-methane and the whole of the ether is ground with cold methanol. By this means there crystallise from 2 grams of ester mixture about 800 mg. of a substance which by further recrystallisation from dilute methanol can be purified up to the melting point of 146° C. and which constitutes the 3.16-diacetoxy-$\Delta_5$-aetiocholenic acid-20-methyl-ester (=acetate methyl ester of the compound VI). The ultra-violet absorption spectrum no longer exhibits the presence of the double bond in 16.17-position in the cyclopentane ring present in the starting material.

Example 14

The substances contained in the mother liquors which after alkaline hydrolysis of the 17-cyano-$\Delta_5.\Delta_{16}$-3-acetoxy-androstadiene at 135° C. in an autoclave with aqueous alcoholic alkali and separation of the $\Delta_5.\Delta_{16}$-unsaturated acid with acetone, remain as easily soluble portions, are acetylated and portions are acetylated and methylated as described in Example 13. By chromatographic adsorption on aluminium oxide there can be fractionated from 6.7 grams of the crude ester mixture obtained 4.2 grams of a fraction which can no longer be eluated with pure benzene but only by a solvent mixture of benzene+3% alcohol. By treatment with methanol and dilute acetone a beautiful crystallisate can be obtained, the melting point of which amounts to 211–215° C., the substance decomposing with frothing. These properties together with the analysis point to the compound V, that is to say a 3.17-diacetoxy-$\Delta_5$-aetiocholene-17-carboxylic acid 20-methyl ester.

EXAMPLE 15

The collected neutral portions produced in the hydrolysis of 17-cyano-$\Delta_5.\Delta_{16}$-3-acetoxy-androstadiene are acetylated according to Examples 13 and 14 and easily obtained crystalline by grinding with some methanol. By repeated recrystallisation from acetone-water the melting point rises to 156–158° C. The substance is free from nitrogen and its analysis shows that there is concerned a compound of the formula IV (=3-acetoxy-$\Delta_5$-aetiocholenic acid-20-ethylester). It no longer possesses U. V. absorption and must be produced by catalytic hydrogenation on one hand and by incomplete hydro-alcoholic degradation of the nitrile group on the other hand. It is possible that there is here concerned a 17-cis-compound which would particularly well explain the difficult saponification of the ester group. The yield from about 6 grams of neutral portions amounts to about 1 gram of crystallisate.

What we claim is:

1. Process for the manufacture of carboxylic acids of the cyclopentano polyhydro phenanthrene series, comprising abstracting the elements of water from compounds of the cyclopentano polyhydro phenanthrene series containing a cyanhydrin grouping at the 17-position and thereby forming the corresponding 16-unsaturated nitriles, and hydrolyzing the resulting 16-unsaturated nitriles to the corresponding carboxylic acids.

2. Process as claimed in claim 1, wherein the unsaturated carboxylic acids are treated with hydrogen until saturation of the cyclopenteno ring has taken place.

3. Modification of the process claimed in claim 1 in which the nitriles unsaturated in ring D with double bond in $\alpha,\beta$-position to the nitrile group are hydrogenated and the nitriles saturated in ring D thus obtained hydrolysed to the corresponding carboxyl compound.

4. Process for the manufacture of carboxylic acids as claimed in claim 1, in which the double bond in $\alpha,\beta$-position with respect to the nitrile group is catalytically hydrogenated at any stage subsequent to the dehydration step.

5. Process as claimed in claim 1, wherein the double bond in $\alpha,\beta$-position with respect to the nitrile group at any suitable stage after the dehydration treatment is hydrogenated in the presence of a mildly acting catalyst at ordinary pressure and ordinary temperature in a medium ranging from neutral to slightly alkaline.

6. Process as claimed in claim 1, in which the unsaturated nitriles are treated with hydrogen until saturation of the cyclopentano ring has taken place and in which the hydrolysis of the saturated nitriles takes place by heating with excess alkali in aqueous-alcoholic medium at elevated pressure.

7. Process as claimed in claim 1, in which the elements of water are abstracted from a cyanhydrin of a member of the class consisting of dehydroandrosterone and a 3-acyl compound thereof to form a doubly unsaturated nitrile, treated with agents splitting off water and the doubly unsaturated nitrile obtained hydrolysed to the corresponding 17-carboxylic acid and this hydrogenated to the compound saturated in the cyclopentane ring.

8. Process as claimed in claim 1, wherein nitriles unsaturated in ring D with double bond in $\alpha,\beta$-position with respect to the nitrile group are hydrolyzed under pressure at elevated temperatures in the presence of metallic hydrogenation catalysts, wherein the carboxylic acid compounds unsaturated in ring D are thereafter separated and wherein the carboxylic acid compounds unsaturated in ring D are isolated from the mixture so obtained.

9. Process as claimed in claim 1, in which a member of the group consisting of the nitrile of the $\Delta_5.\Delta_{16}$-3-hydroxy-androstadiene-17-carboxylic acid and its 3-acetyl compound is produced as intermediate product.

10. Process as claimed in claim 1, in which as hydrolysing agent aqueous-alcoholic alkali is employed, whereby hydroxy acids which are saturated in ring D are produced.

11. Process as claimed in claim 1, in which the hydrolysis is carried out by aqueous-alcoholic alkali in the presence of metallic catalysts.

12. Process for isolating from their mother liquors hydroxy carboxylic acids prepared as set forth in claim 1, comprising treating with an acylating agent to esterify the hydroxyl groups, treating with an alkylating agent to esterify the carboxyl group, and subjecting the product to the action of a chromatographic adsorption agent.

13. Process for the manufacture of $\alpha,\beta$-unsaturated nitriles of the cyclopentanopolyhydrophenanthrene series by dehydration of compounds of the cyclopentanopolyhydrophenanthrene series containing in 17-position a cyanhydrin group in which the dehydration is carried out by heating the oxy-nitriles with phosphoroxy-halogenides and tertiary amines.

14. Process as claimed in claim 13 in which the dehydration is carried out by treating with phosphor-oxy-halogenides and pyridine at a temperature of about 150° C.

15. Process as claimed in claim 13, in which tertiary amines are employed which possess a boiling point above 150° C.

16. Process as claimed in claim 13 in which a member of the class consisting of quinolin, lutidine and collidine is employed.

17. Process as claimed in claim 13, in which the dehydration is carried out with tertiary amines of a boiling point below 150° C. by heating at pressures above atmospheric.

18. Nuclearly saturated and unsaturated 3-X-17-Y-$\Delta^{16}$-unsaturated compounds of the 10,13-dimethyl cyclopentanopolyhydrophenanthrene series wherein X represents a member of the group consisting of oxygen, a hydroxyl group and a group which can be converted by hydrolysis into said groups, and Y a member of the group consisting of COOH and CN.

19. 17-cyano-$\Delta^{5.16}$-3-acetoxy-androstadiene.

20. $\Delta^{5.16}$-3-hydroxy-androstadiene-17-carboxylic acid.

21. $\Delta^{5.16}$-3-acetoxy-androstadiene-17-carboxylic acid.

22. 17-cyano-$\Delta^{5.16}$-3-OR-androstadiene, wherein R is a member of the class consisting of hydrogen and acyl groups.

23. Process as claimed in claim 1, in which as hydrolyzing agent a highly concentrated aqueous alcoholic solution of alkali is employed, whereby hydroxy acids which are saturated in ring D are produced.

24. Process as claimed in claim 1, wherein the hydrolysis is carried out with aqueous alcoholic alkali solution in the presence of a catalyst comprised essentially of nickel.

25. Process as claimed in claim 1, in which the dehydration is carried out with tertiary amines of a boiling point below 150° C. by heating at above atmospheric pressure.

26. Process for the manufacture of carboxylic acids of the cyclopentano polyhydro phenanthrene series, wherein steroid compounds containing a hydroxy-free 17-position to which is attached a nitrile group are hydrolyzed to form the carboxylic acids.

27. Process for the manufacture of carboxylic acids of the cyclopentano polyhydro phenanthrene series, wherein steroid compounds containing a hydroxy-free 17-position to which is attached a nitrile group and containing a double bond between the carbon atoms 16 and 17, are partially hydrogenated to form a saturated cyclopentano ring and are hydrolyzed to the carboxylic acids in any desired order.

28. In a process for the conversion of a 17-cyanhydrin of the 10,13-dimethyl-cyclopentano-polyhydrophenanthrene series into the 17-carboxylic acid and its neutralization products, that intermediate step which comprises dehydrating the 17-cyanhydrin to the corresponding 16-unsaturated nitrile.

ADOLF BUTENANDT.
HANS DANNENBAUM.
JOSEF SCHMIDT-THOMÉ.